United States Patent
Chambon

(10) Patent No.: US 10,447,073 B2
(45) Date of Patent: Oct. 15, 2019

(54) POWER SUPPLY CONTROL

(71) Applicant: SCHNEIDER ELECTRIC IT CORPORATION, West Kingston, RI (US)

(72) Inventor: Patrick Chambon, Saint Martin d'hères (FR)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 438 days.

(21) Appl. No.: 14/759,445

(22) PCT Filed: Jan. 7, 2013

(86) PCT No.: PCT/US2013/020511
§ 371 (c)(1),
(2) Date: Jul. 7, 2015

(87) PCT Pub. No.: WO2014/107169
PCT Pub. Date: Jul. 10, 2014

(65) Prior Publication Data
US 2015/0340908 A1    Nov. 26, 2015

(51) Int. Cl.
*H02J 7/00* (2006.01)
*H02J 9/00* (2006.01)
(Continued)

(52) U.S. Cl.
CPC ............... *H02J 9/061* (2013.01); *H02J 3/16* (2013.01); *H02J 3/18* (2013.01); *H02J 7/0068* (2013.01);
(Continued)

(58) Field of Classification Search
CPC .. H02J 9/061; H02J 3/16; H02J 7/0068; H02J 7/0077; H02J 3/18; H02M 1/4208; Y02B 70/126; Y02E 40/34; Y10T 307/625
(Continued)

(56) References Cited
U.S. PATENT DOCUMENTS 5,229,651 A    7/1993 Baxter, Jr. et al.
5,329,222 A    7/1994 Gyugyi et al.
(Continued)

FOREIGN PATENT DOCUMENTS

CN    1281290 A    1/2001
CN    102835003 A    12/2012
(Continued)

OTHER PUBLICATIONS

Author: Chen, C.S. et al.; Title: "Design of Tie Line Tripping and Load Shedding Scheme for Distribution Microgrid Systems With Wind Power Generation"; Date: 2011; Publisher: IEEE; Pertinent pp. 1-7 (Year: 2011).*
(Continued)

*Primary Examiner* — Richard Tan
(74) *Attorney, Agent, or Firm* — Lando & Anastasi, LLP

(57) ABSTRACT

An uninterruptible power supply includes an input to receive an input AC voltage from a power source, an input circuit coupled to the input and configured to provide power factor correction, and a controller coupled to the input circuit. The controller is configured to detect that a reactive current is generated by one or more loads coupled to the power source and the input, and based, at least in part, on the detected reactive current, adjust an operating characteristic of the input circuit.

8 Claims, 4 Drawing Sheets

(51) Int. Cl.
   *H02J 9/06* (2006.01)
   *H02J 3/18* (2006.01)
   *H02M 1/42* (2007.01)
   *H02J 3/16* (2006.01)
(52) U.S. Cl.
   CPC ......... *H02J 7/0077* (2013.01); *H02M 1/4208* (2013.01); *Y02B 70/126* (2013.01); *Y02E 40/34* (2013.01); *Y10T 307/625* (2015.04)
(58) Field of Classification Search
   USPC .......................................................... 307/66
   See application file for complete search history.

(56) References Cited

U.S. PATENT DOCUMENTS

| | | |
|---|---|---|
| 5,579,197 A | 11/1996 | Mengelt et al. |
| 5,642,300 A | 6/1997 | Gubisch et al. |
| 6,693,409 B2 | 2/2004 | Lynch et al. |
| 6,944,034 B1 | 9/2005 | Shteynberg et al. |
| 7,239,043 B2 | 7/2007 | Taimela et al. |
| 7,550,873 B2 | 6/2009 | Jiang et al. |
| 7,566,988 B2 | 7/2009 | Heber et al. |
| 7,948,118 B2 | 5/2011 | Chambon |
| 8,305,051 B2 | 11/2012 | Phadke et al. |
| 8,552,589 B2 | 10/2013 | Ghosh et al. |
| 8,791,597 B2 | 7/2014 | Chen |
| 8,946,931 B2 | 2/2015 | Jayaraman et al. |
| 9,203,244 B2 | 12/2015 | Abe |
| 2003/0016548 A1 | 1/2003 | Tassitino et al. |
| 2003/0035308 A1 | 2/2003 | Lynch et al. |
| 2004/0085785 A1 | 5/2004 | Taimela |
| 2005/0141157 A1 | 6/2005 | Okayama et al. |
| 2005/0270813 A1 | 12/2005 | Zhang et al. |
| 2005/0275976 A1 | 12/2005 | Taimela et al. |
| 2006/0238143 A1 | 10/2006 | Uematsu et al. |
| 2008/0088183 A1 | 4/2008 | Eckroad et al. |
| 2008/0278005 A1 | 11/2008 | Chambon |
| 2009/0184582 A1 | 7/2009 | Hwang |
| 2009/0237963 A1 | 9/2009 | Prasad et al. |
| 2010/0006551 A1 | 1/2010 | Geissler et al. |
| 2012/0248874 A1 | 10/2012 | Pan et al. |
| 2012/0302112 A1 | 11/2012 | Hartig et al. |
| 2013/0162049 A1 | 6/2013 | Morati et al. |
| 2015/0084423 A1 | 3/2015 | Gamborg |
| 2015/0333566 A1 | 11/2015 | Berard |

FOREIGN PATENT DOCUMENTS

| | | |
|---|---|---|
| JP | H11289668 A | 10/1999 |
| WO | 2004054065 A1 | 6/2004 |
| WO | 2010036974 A2 | 4/2010 |
| WO | WO2014041390 * | 9/2012 |
| WO | 2014041390 A1 | 3/2014 |

OTHER PUBLICATIONS

Author: Kawabata, T. et al.; Title: "Three Phase Parallel Processing UPS using Multi-Functional Inverter"; Date: 1989 (Year: 1989).*

Author: Vaz, A. R. et al.; Title: "Bidirectional Three-Phase Bridge Converter Drived to Several Functions"; Date: 2004; Publisher: IEEE 2004 35th Annual IEEE Power Electronics Specialist Conference; (Year: 2004).*

Extended European Search Report from corresponding European Application No. 13870278.2 dated Jul. 29, 2016.

Yang X et al: "Shore to ship converter system for energy saving and emission reduction", Power Electronics and ECCE Asia (ICPE &ECCE), 2011 IEEE 8th International Conference on, IEEE, May 30, 2011 (May 30, 2011), pp. 2081-2086, XP031956118, DOI: 10.11 09/ ICPE.2011.5944522, ISBN: 978-1-61284-958-4.

Notification of Transmittal of the International Search Report and the Written Opinion of the International Searching Authority from corresponding PCT/US2013/020511 dated Mar. 18, 2013.

* cited by examiner

POWER SUPPLY CONTROL

This application is a U.S. National Stage Application under 35 U.S.C. § 371 from International Application No. PCT/US2013/020511, filed Jan. 7, 2013, which is hereby incorporated by reference in its entirety for all purposes.

BACKGROUND OF THE INVENTION

1. Field of Invention

Embodiments of the invention relate generally to control of an uninterruptible power supply system.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 and several MVA for several minutes to hours.

Various types of UPS systems may employ power converters. For example, power converters may be employed in an on-line UPS that can supply power derived from a primary source of power and/or a backup source of power without interruption provided either the primary power source or the secondary power source is available. Power converters may also be employed in an off-line UPS system that includes a transfer switch that switches from primary power to backup power if primary power is lost unexpectedly and there is an interruption in power supplied to the electrical load.

The average power obtained from an AC line supply through the UPS described above is typically less than the product of the RMS (root mean square) voltage and the RMS current. The ratio of the average power to the product of the RMS voltage and the RMS current is known as the power factor. Power Factor Correction (PFC) is used to improve an input power factor. PFC schemes control the input current drawn by a UPS to follow the input voltage in both shape and time.

SUMMARY OF THE INVENTION

According to one embodiment an uninterruptible power supply includes an input to receive an input AC voltage from a power source, an input circuit coupled to the input and configured to provide power factor correction, and a controller coupled to the input circuit. The controller is configured to detect that a reactive current is generated by one or more loads coupled to the power source and the input, and based, at least in part, on the detected reactive current, adjust an operating characteristic of the input circuit.

In some embodiments, the controller is configured to adjust the operating characteristic of the input circuit by, at least in part, generating a reactive compensation current.

In some embodiments, the controller is configured to detect that the reactive current is generated by, at least in part, monitoring the input AC voltage.

In some embodiments, the controller is further configured to compare the input AC voltage to a reference voltage.

In some embodiments, the reactive compensation current is a function of the AC voltage.

In some embodiments, the reactive compensation current is substantially equal to a current in phase opposition with the reactive current.

In some embodiments, the input circuit is configured to determine that the power source is an engine-generator.

In some embodiments, the controller is configured to adjust the operating characteristic of the input circuit by, at least in part, adjusting the power factor correction provided by the input circuit.

Aspects are also directed toward a method for controlling an uninterruptible power supply, the method including receiving, at an input, an input AC voltage from a power source, providing, by an input circuit, power factor correction, detecting that a reactive current is generated by one or more loads coupled to the power source and the input, and based, at least in part, on the detected reactive current, adjusting an operating characteristic of the input circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
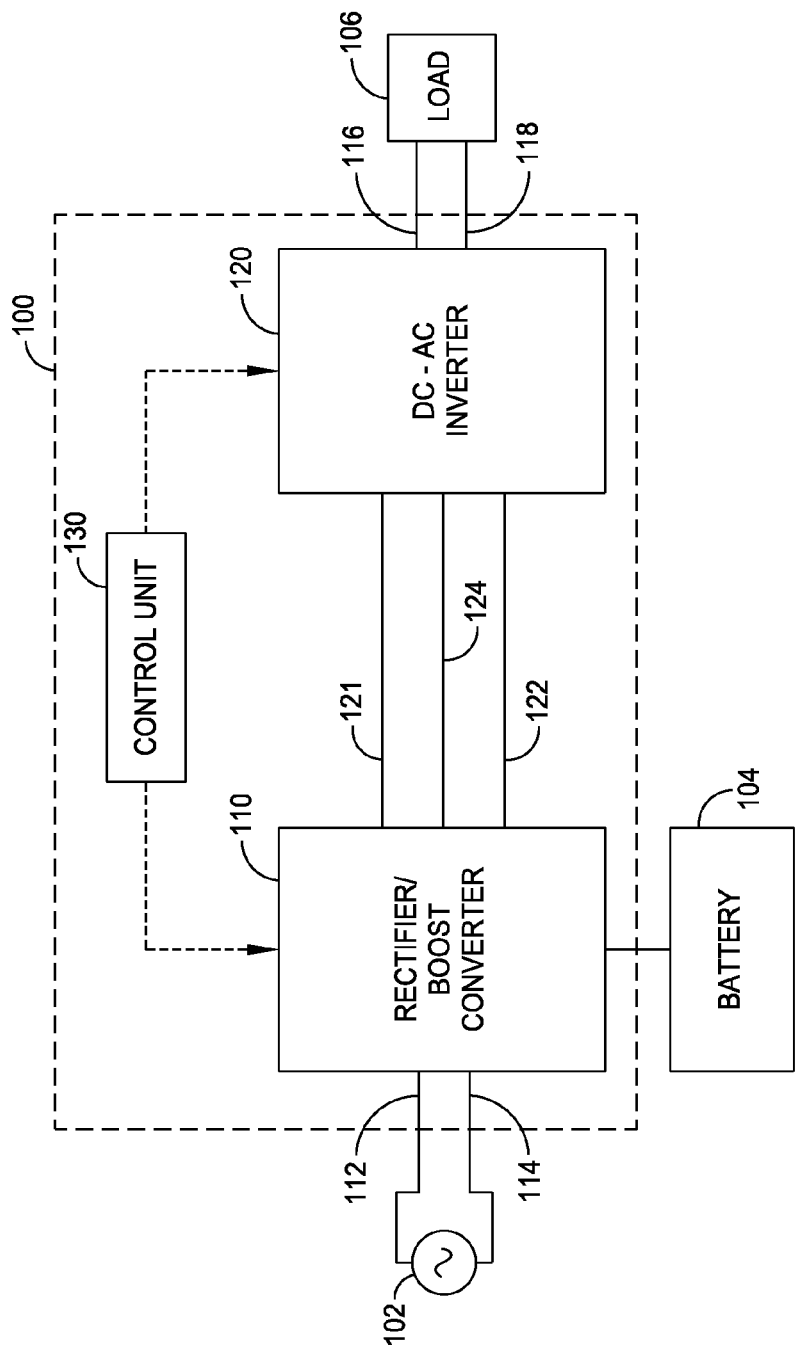
FIG. 1 is a functional block diagram of an uninterruptible power supply in accordance with one embodiment of the present disclosure.

The aspects disclosed herein in accordance with the present embodiments are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present disclosure relate to controlling power factor correction (PFC) and compensating for reactive current from loads coupled in parallel with an uninterruptible power supply (UPS). As will be understood by one of skill in the art, the ratio of real power to apparent power in an AC power system is called the power factor.

Where the power factor is less than unity (1), the load is considered to have reactive properties that cause some of the power drawn by the load to be returned to the power system, which is often wasted as heat. This can be particularly detrimental for loads powered by generators. It is known to include power factor correction circuitry in a UPS to control the power factor of the UPS to be close or equal to unity.

However, if another load is coupled in parallel with the UPS, the other load may have an unsatisfactory power factor, causing the combined parallel load to have an unsatisfactory power factor. In some embodiments, the PFC circuitry of the UPS is configured to detect operation in parallel with a load having a power factor less than unity and adjust the power draw of the UPS, so the combined parallel load has a power factor close to or equal to unity.

FIG. 1 is a block diagram of a UPS 100 according to one embodiment. The UPS 100 provides regulated power to a load 106 from either an AC power source 102 or a backup power source, such as a battery 104. The UPS 100 includes a rectifier/boost converter 110, an inverter 120, and a control unit 130 for controlling the rectifier/boost converter and the inverter. The UPS has a line (or phase) input 112 and a neutral input 114 of the AC power source 102, and a line output 116 and a neutral output 118 each coupled to the load 106.

In line mode of operation, under control of the control unit 130, the rectifier/boost converter 110 converts the input AC voltage into positive and negative DC voltages at a positive DC bus 121 and a negative DC bus 122, respectively. The positive DC bus 121 and the negative DC bus 122 may, for example, each be rated up to +/−400 VDC. The rectifier/boost converter 110 includes a common or neutral line 124. The neutral line 124 may be coupled to the input neutral 114 and the output neutral 118 to provide a continuous neutral path through the UPS 100. The rectifier/boost converter 110 also includes a battery charging circuit (not shown) for charging the battery 104 during the line mode of operation.

In backup mode of operation (also called battery mode of operation), upon loss of input AC power the rectifier/boost converter 110 generates the positive and negative DC voltages from the battery 104. In both line and backup modes of operation, the inverter 120 receives the positive DC voltage 121 and the negative DC voltage 122 from the rectifier/boost converter 110. The inverter 120 converts the positive and negative DC voltages into an output AC voltage at lines 116 and 118.

Figure 2:
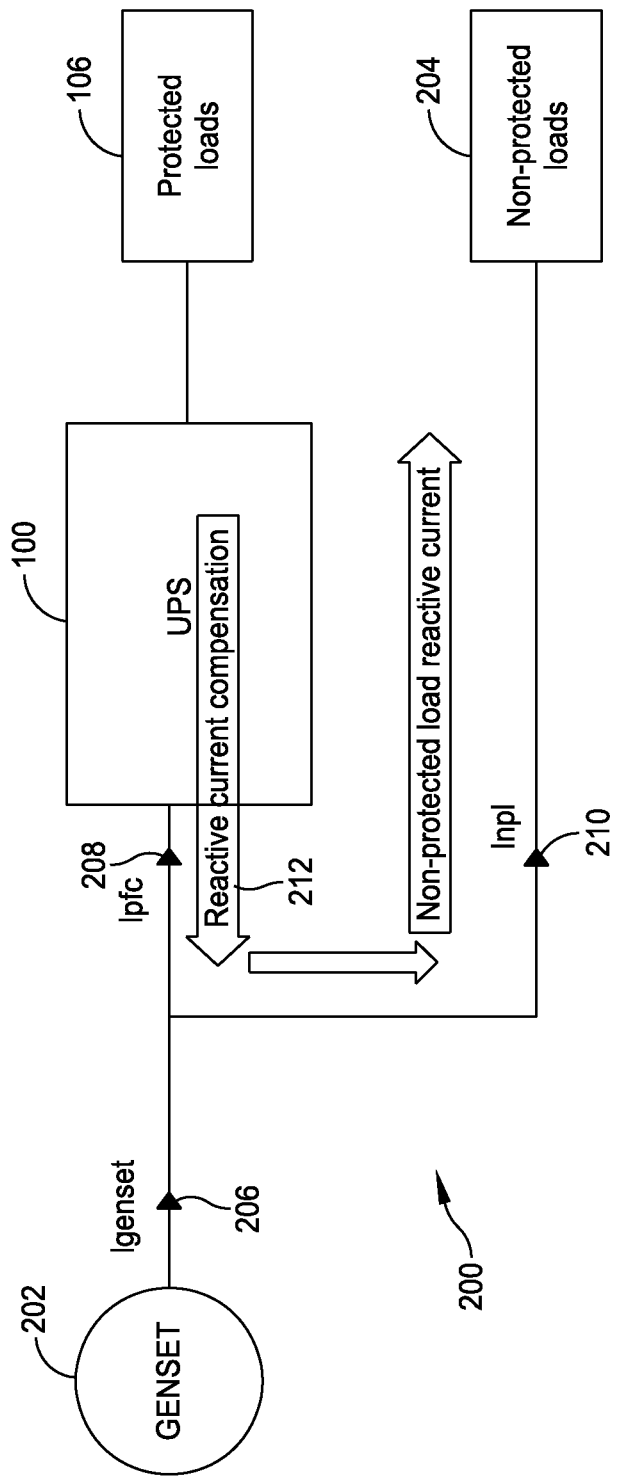
FIG. 2 is a functional block diagram of a circuit including an uninterruptible power supply in accordance with one embodiment of the present disclosure.

FIG. 2 is a block diagram of an example system 200 including the UPS 100, according to some embodiments. The system 200 includes a power source, such as an engine-generator (genset) 202. The genset 202 is coupled to the UPS 100. The load 106 is coupled to the output of the UPS 100. One or more non-protected loads 204 are coupled to the genset 202. In the system 200, non-protected loads 204 are coupled directly to the genset 202 and in parallel with the UPS 100. Thus, the non-protected loads 204 are coupled to the genset 202 and the input of the UPS 100.

As discussed in above, existing UPSs provide power factor correction for the power they draw from a generator, such as the genset 202. However, in the system 200, the non-protected loads 204, can draw lagging or leading reactive power directly from the genset 202, reducing the effective power that the genset can deliver and possibly causing the genset damage and/or to shut down. To compensate for such loads, in at least one embodiment, the UPS 100 is configured to detect the reactive current generated by the non-protected loads 204 and adjust the power factor correction provided by the UPS 100 to provide power factor correction for the combined load powered by the genset. The adjustments are made to the power factor correction provided by the UPS 100 to allow the output current of the genset 202 to remain substantially active while providing power to both protected and non-protected loads.

An output current of the genset 202, $I_{genset}$ 206, consists of an input current of the UPS 100, $I_{pfc}$ 208, and an input current of the non-protected load 204, $I_{npl}$ 210. The output current can be calculated as $$I_{genset} = I_{pfc} + I_{npl}$$

Looking at reactive currents, the reactive current can similarly be calculated as $$I_{gensetR} = I_{pfcR} + I_{nplR}$$

In some embodiments, the power factor correction circuit of the UPS 100, when operating as the only load on the the genset 202, controls the current draw from the genset such that $I_{pfcR}$ is substantially equal to zero. In addition, when operating in parallel with a load, such as load 204, the power factor correction circuit of UPS 100 adjusts the current draw of the UPS 100 to deliver a reactive compensation current 212 in phase opposition with $I_{nplR}$ so that the reactive current at the genset 202 is substantially equal to zero.

Figure 3:
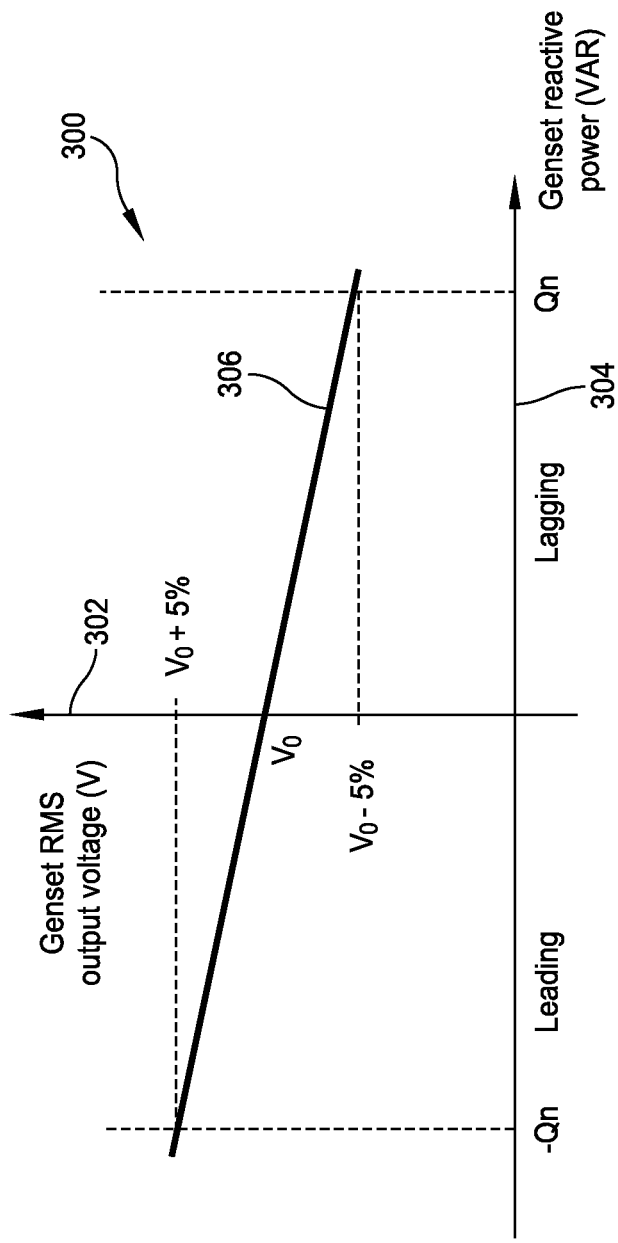
FIG. 3 is a graph of a generator output in accordance with one embodiment of the present disclosure.

In one embodiment, to provide compensation, the UPS 100 determines the reactive load level of the genset 202 by monitoring a voltage at the input of the UPS 100. In response to a demand for reactive power, typical gensets will respond by operating in droop mode with a variable voltage and frequency and with the output voltage of the genset 202 being a function of output reactive power of the genset 202. FIG. 3 shows an example graph 300 of the output voltage 306 of the genset 202 as a function of the reactive load on the genset 202. The y-axis 302 represents an RMS output voltage of the genset 202. The x-axis 304 represents the genset reactive power (var). The output voltage 306 crosses the y-axis at $V_0$, where there is no reactive power and the load is neither lagging nor leading.

As the load tends toward lagging, the var becomes positive and the output voltage 306 falls below $V_0$ and droops. Conversely, if the load tends toward leading, the var becomes negative and the output voltage 306 increases above $V_0$. The UPS 100 can detect the output voltage level 306 at the input of the UPS 100 and determine the reactive load level on the genset 202. Upon determining the reactive load on the genset 202, the UPS 100 compensates for the var of the non-protected load 204 by adjusting the PFC circuit of the UPS 100.

Figure 4:
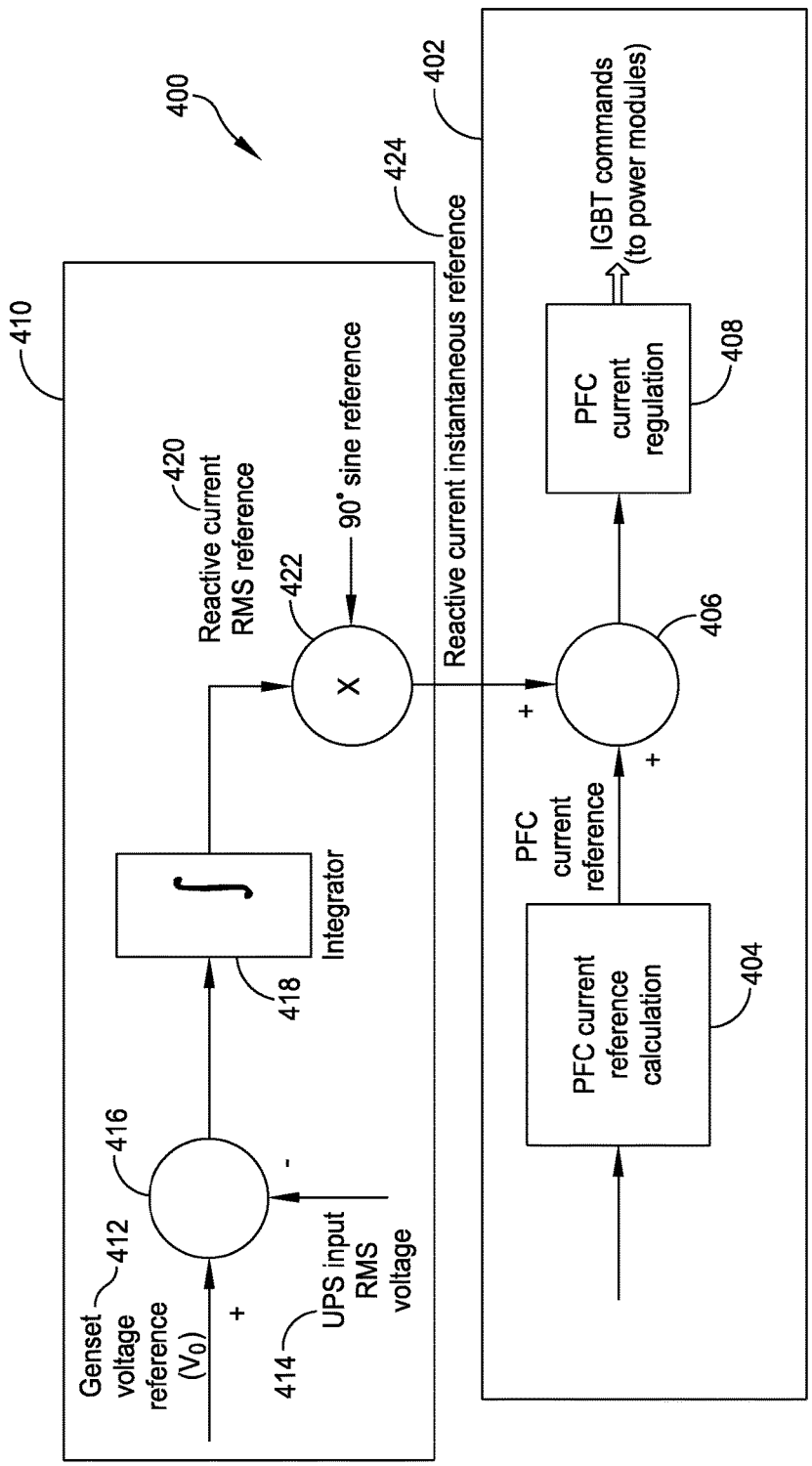
FIG. 4 is a functional block diagram of a control algorithm for an uninterruptible power supply in accordance with an embodiment of the present disclosure.

FIG. 4 shows a block diagram of an example control algorithm 400 of the UPS 100 that may be implemented using a combination of hardware and software in the control unit 130. The control algorithm 400 includes a power factor correction algorithm 402, which includes a control loop that calculates a PFC current reference 404 to actively control the power consumed by the UPS 100. In the absence of the additional load 204, the PFC current reference 404 is used to generate a set of PFC current regulation commands 408, which work to maintain the UPS 100 at a power factor of unity.

The UPS 100 can adjust the PFC algorithm 402 using algorithm 410 to provide additional power factor correction for the load 204. The control algorithm 410 receives a genset reference voltage 412, which corresponds to the voltage at $V_0$ (see FIG. 3), when the load on the genset 202 is active and neither leading nor lagging. The genset reference voltage 412 can be received as an input parameter from a user, for example, on an initial setup of the UPS 100. The control algorithm 410 compares the genset reference voltage 412 to a UPS input RMS voltage 414, which is the RMS voltage detected at the UPS 100 and corresponds to the output voltage of the genset 202. The UPS input RMS voltage 414 is subtracted from the genset voltage reference 412 at 416 to determine the reactive load level on the genset 202.

The output of 416 is provided to an integrator 418. The integrator 418 modifies an output of the integrator 418 until an input of the integrator 418 is zero. Thus, when the system is at steady state, the result of the integrator 418 is an RMS reactive current reference 420 that corresponds to the value which compensates the non-protected load 204. In some embodiments, other types of regulators (e.g., a proportional-integrator-derivative regulator, a proportional regulator) are used instead of or in addition to the integrator 418. The RMS reactive current reference 420 is the constant RMS value of the current on one cycle. The RMS reactive current reference 420 is multiplied by a 90 degree sine reference using multiplier 422 to generate a sinusoidal reactive current. The sine reference is 90 degrees as the current is 90 degrees out of phase with the voltage in a reactive current. The product of 422 is an instantaneous reactive current reference 424, which is used to adjust the PFC algorithm 402. The instantaneous reactive current reference 424 is added to the PFC current reference 404 at 406. The adjusted current reference is used to generate a set of PFC current regulation commands 408. The PFC current regulation commands 408 can be executed by the controller to generate the reactive compensation current 212. The reactive compensation current 212 can be regulated by a parameter that sets a maximum allowed reactive current. The maximum allowed reactive current parameter can be received as an input from a user, for example, on an initial setup of the UPS 100.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide the PFC current regulation commands to each of the switching devices within the circuit for controlling the power conversion functions. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, a digital signal processor (DSP), a field programmable gate array (FPGA), an application specific integrated circuit (ASIC), and/or other elements in any combination that may be used to perform the respective functions of the controller. In various embodiments, one or more controllers may be part of the UPS, or external to but operatively coupled with the UPS.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an IGBT, an SCR, a thyristor, etc.). Additionally, other devices, such as resistors, capacitors, inductors, batteries, power supplies, loads, transformers, relays, diodes, and the like may be included in a single device, or in a plurality of connected devices.

Embodiments of the present disclosure may be used with uninterruptible power sources having a variety of input and output voltages and may be used in single phase or multi-phase uninterruptible power supplies.

While the embodiments described above have been with reference to a UPS, the algorithms can be implemented on any device providing power factor correction.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. An uninterruptible power supply, comprising:
   an input to receive input AC power from a power source and configured to be coupled to one or more non-protected loads;
   an output configured to be coupled to one or more protected loads;
   an input circuit coupled to the input and configured to provide power factor correction and convert the input AC power into DC power;
   a DC bus coupled to the input circuit;
   an inverter coupled to the DC bus and configured to provide output AC power derived from the DC power to the output; and
   a controller coupled to the input circuit and configured to:
      monitor an input AC voltage at the input;
      generate a reactive current reference by comparing the monitored input AC voltage to an input voltage reference; and
      based, at least in part, on the reactive current reference, provide a reactive compensation current to the input to compensate for reactive power drawn by the one or more non-protected loads coupled to the input.

2. The uninterruptible power supply of claim 1, wherein the reactive compensation current is substantially equal to a current in phase opposition with a reactive current corresponding to the reactive power drawn by the one or more loads.

3. The uninterruptible power supply of claim 1, wherein the input circuit is configured to determine that the power source is an engine-generator.

4. The uninterruptible power supply of claim 1, wherein the controller is configured to provide the reactive compensation current by, at least in part, adjusting the power factor correction provided by the input circuit.

5. A method for controlling an uninterruptible power supply, the method comprising:
   receiving, at an input configured to be coupled to one or more non-protected loads, input AC power from a power source;
   providing, by an input circuit, power factor correction;
   converting, by the input circuit, the input AC power into DC power;
   converting, by an inverter, the DC power into output AC power;
   providing the output AC power to one or more protected loads coupled to the inverter;
   monitoring an input AC voltage at the input;
   generating a reactive current reference by comparing the monitored input AC voltage to an input voltage reference; and
   based, at least in part, on the reactive current reference, providing a reactive compensation current to the input to compensate for reactive power drawn by the one or more non-protected loads coupled to the input.

6. The method of claim 5, wherein generating the reactive compensation current comprises generating a current substantially equal to a current in phase opposition with a reactive current corresponding to the reactive power drawn by the one or more loads.

7. The method of claim 5, further comprising determining that the power source is an engine-generator.

8. The method of claim 5, wherein providing the reactive compensation current comprises adjusting the power factor correction provided by the input circuit.

* * * * *